United States Patent
Ying

(10) Patent No.: US 6,201,995 B1
(45) Date of Patent: Mar. 13, 2001

(54) WIRING METHOD AND APPARATUS FOR DISTRIBUTED CONTROL NETWORK

(75) Inventor: Jeffrey Ying, Glendora, CA (US)

(73) Assignee: I/O Control Corporation, Azusa, CA (US)

( * ) Notice: Subject to any disclaimer, the term of this patent is extended or adjusted under 35 U.S.C. 154(b) by 0 days.

(21) Appl. No.: 09/249,408

(22) Filed: Feb. 12, 1999

Related U.S. Application Data

(63) Continuation of application No. 08/854,172, filed on May 9, 1997, now Pat. No. 5,907,486.

(51) Int. Cl.[7] ............................. G05B 15/00; G01R 31/08
(52) U.S. Cl. ............................. 700/3; 370/222; 370/242; 370/405; 700/82
(58) Field of Search ................................... 700/3, 79, 82, 700/2, 9, 19–21; 370/216, 221, 222–224, 242, 245, 249, 408, 404–406; 709/208, 209; 710/100, 110, 128

(56) References Cited

U.S. PATENT DOCUMENTS

| | | | |
|---|---|---|---|
| Re. 31,852 | 3/1985 | Soderblom | 370/90 |
| 3,732,543 | * 5/1973 | Rocher et al. | 370/405 |
| 3,890,471 | 6/1975 | Hachenburg | 370/405 |
| 4,539,679 | * 9/1985 | Bux et al. | 370/405 |
| 4,579,407 | 4/1986 | Shimada | 439/502 |
| 5,003,579 | 3/1991 | Jones | 379/93.05 |
| 5,255,268 | * 10/1993 | Cato et al. | 370/405 |
| 5,475,818 | * 12/1995 | Molyneaux et al. | 709/208 |
| 5,583,754 | 12/1996 | Leonhardt et al. | 364/132 |
| 5,751,220 | 5/1998 | Ghaffari | 340/825.21 |
| 5,761,443 | * 6/1998 | Kranich | 710/100 |

* cited by examiner

*Primary Examiner*—William Grant
*Assistant Examiner*—Steven R. Garland
(74) *Attorney, Agent, or Firm*—Lyon & Lyon LLP

(57) ABSTRACT

A multi-tier, master-slave control network having multiple buses comprises a master node and a plurality of slave nodes operating over each of the multiple buses. Each master node comprises a downlink transceiver, and each slave node comprises an uplink transceiver. All of the nodes in the control network are connected in a continuous loop configuration with each segment of the loop comprising a cable connector of either a first type (feed thru) or a second type (crossover). Each cable connector comprises a pair of signal wires for each bus. The type of cable connector between any two adjacent nodes in the loop is related according to which of the uplink or downlink transceiver should be connected to which bus.

15 Claims, 14 Drawing Sheets

WIRING METHOD AND APPARATUS FOR DISTRIBUTED CONTROL NETWORK

RELATED APPLICATION DATA

This application is a continuation of application Ser. No. 08/854,172, now U.S. Pat. No. 5,907,486, filed on May 9, 1997.

BACKGROUND OF THE INVENTION

1. Field of the Invention

The field of the invention pertains to methods and apparatus for connecting nodes in a control network having multiple data buses.

2. Background

Automated control systems are commonly used in a number of manufacturing, transportation, and other applications, and are particularly useful to control machinery, sensors, electronics, and other system components. For example, manufacturing or vehicular systems may be outfitted with a variety of sensors and automated electrical and/or mechanical parts that require enablement or activation when needed to perform their predefined functions. Such systems commonly require that functions or procedures be carried out in a prescribed order or with a level of responsiveness that precludes sole reliance on manual control. Also, such systems may employ sensors or other components that require continuous or periodic monitoring and therefore lend themselves to automated control.

As the tasks performed by machinery have grown in number and complexity, a need has arisen for ways to exercise control over the various components of a system rapidly, efficiently and reliably. The sheer number of system components to be monitored, enabled, disabled, activated, deactivated, adjusted or otherwise controlled can lead to difficulties in designing and implementing a suitable control system. As the number of system components to be controlled is increased, not only is the operation of the control system made more complicated, but also the wiring and inter-connections of the control system are likewise more elaborate. In addition, greater reliance on automated control has resulted in larger potential consequences if the automated control system fails.

Traditionally, control systems in certain applications, such as transit vehicles and railcars, have relied upon relay-based control technology. In such systems, relays and switches are slaved to a logic circuit that serves to switch signal connections. This approach requires a large number of relays and a substantial amount of wiring throughout the vehicle. In some instances distributed processors or logic circuits may be used for subsystems such as the door, but these processors or logic circuits often take up significant space and can be costly to maintain.

A substantial improvement has recently been made in the field of control systems. An improved network control system recently developed uses a dual-bus architecture along with distributed controllers. In this improved network control system, a primary bus forms a high-speed, bi-directional communication link interconnecting a main data bus controller with distributed slave modules, one of which acts as a second data bus controller connected to a secondary, low-speed data bus. The slave modules are generally connected to various input/output ports. The second data bus controller can be connected to second-tier slave modules over the secondary, low-speed data bus. The main data bus controller, secondary data bus controller, first-tier slave modules, second-tier slave modules, input/output ports and other system components collectively form a hierarchical system wherein the main data bus controller supervises the first-tier slave modules, including the second data bus controller, the second data bus controller supervises the second-tier slave modules, and the first-tier slave modules and second-tier slave modules supervise their assigned input/output functions.

While the dual-bus control network as described above has many advantages, there are also ways in which it could be improved further. The dual-bus control network architecture as currently known in the art generally relies on a single top-level main data bus controller. If the main data bus controller fails, system performance will be adversely impacted. Also, the possibility of a short circuit occurring, particularly over a region of the bus, is a constant danger. In addition to disrupting communication signals among the components accessing the bus, a short circuit can be difficult to trace and cause substantial disruption of system service while maintenance personnel attempt to locate the short circuit Furthermore, while the dual-bus network control architecture reduces wiring needed in a vehicle or other automated system, simplification of wiring connections would lead to greater ease of implementation and maintenance.

Accordingly, it would be advantageous to provide a network control system that has a means for recovering from a failure in a main data bus controller or otherwise mitigating the effects such a failure. It would further be advantageous to provide a network control system that reduces the impact of a short circuit and enables rapid identification of the location of a short circuit by maintenance personnel. It would further be advantageous to provide a distributed network control system with simplified wiring and connections.

SUMMARY OF THE INVENTION

The invention provides in one aspect a technique for connecting nodes, such as master nodes and slave nodes, in a hierarchical, multi-bus control network.

In one aspect of the invention, a multiple-bus hierarchical control network is provided. A first-tier master node controls a plurality of first-tier slave nodes using a first common bus for communication. One of the first-tier slave nodes is connected to a second common bus, and operates as a second-tier master node for a plurality of second-tier slave nodes connected to the second common bus. Each master node comprises at least a downlink transceiver, and each slave node comprises at least an uplink transceiver. All of the nodes in the control network are connected in a continuous loop configuration with each segment of the loop comprising a cable connector of either a first type (feed thru) or a second type (crossover). Each cable connector comprises a pair of signal wires for each bus. The type of cable connector between any two adjacent nodes in the loop is related according to which of the uplink or downlink transceiver should be connected to which bus.

In a preferred embodiment of the invention, a master node serves as a controller for a multiplicity of slave nodes. The master node polls the slave nodes periodically. Each of the slave nodes comprises a failure mode detector whereby, if a slave node fails to receive a message from the master node within a certain fixed period of time, then the slave node takes over control for the master node.

In another aspect of the invention, prioritized redundant backup control for the master node is provided by establishing an order in which the slave nodes take over the master node, or substitute master node, in the case of multiple node failures. Preferably, each slave node is programmed to detect a failure mode condition after a different amount of time than the other slave nodes are programmed with. When the first slave node programmed with the shortest failure mode detection time detects a failure mode condition, it takes over for the master node and becomes the substitute master node. Should the substitute master node also fail, then the slave node programmed with the next shortest failure mode detection time will detect a failure mode condition and take over for the substitute master node, becoming the second substitute master node. Likewise, in turn each slave node has the capability of becoming the master node when its programmed failure mode detection time elapses. In this manner, prioritized redundant backup control is achieved for the master node.

Should a failure of the first-tier master node occur, any of the first-tier slave nodes connected to the first common bus can take over the first-tier master node, doing so according to their programmed priority. Should a failure of the second-tier master node occur, any of the second-tier slave nodes connected to the second common bus can take over the second-tier master node, doing so according to their programmed priority. Redundant master control is thereby provided for both the first tier and second tier in the hierarchical control network.

A preferred node comprises two separate transceivers, an uplink transceiver for receiving control information, and a downlink transceiver for sending out control information. Each node therefore has the capability of performing either in a master mode or a slave mode, or in both modes simultaneously.

Further variations and embodiments are also disclosed herein, and are described hereinafter and/or depicted in the figures.

DETAILED DESCRIPTION OF THE PREFERRED EMBODIMENT(S)

This application is related to U.S. patent application Ser. No. 08/854,160, now U.S. Pat. No. 5,061,000, filed in the name of inventor Jeffrey Ying and entitled "Backup Control Mechanism in a Distributed Control Network," U.S. patent application Ser. No. 08/853,989, now U.S. Pat. No. 6,094,416, filed in the name of inventor Jeffrey Ying and entitled "Multi-Tier Architecture for Control Network," and U.S. patent application Ser. No. 08/853,983 filed in the name of inventors Jeffrey Ying and Michael Kuang and entitled "Fault Isolation and Recovery In A Distributed Control Network," all three of which foregoing applications are filed concurrently herewith and hereby incorporated by reference as if set forth fully herein.

Figure 1:
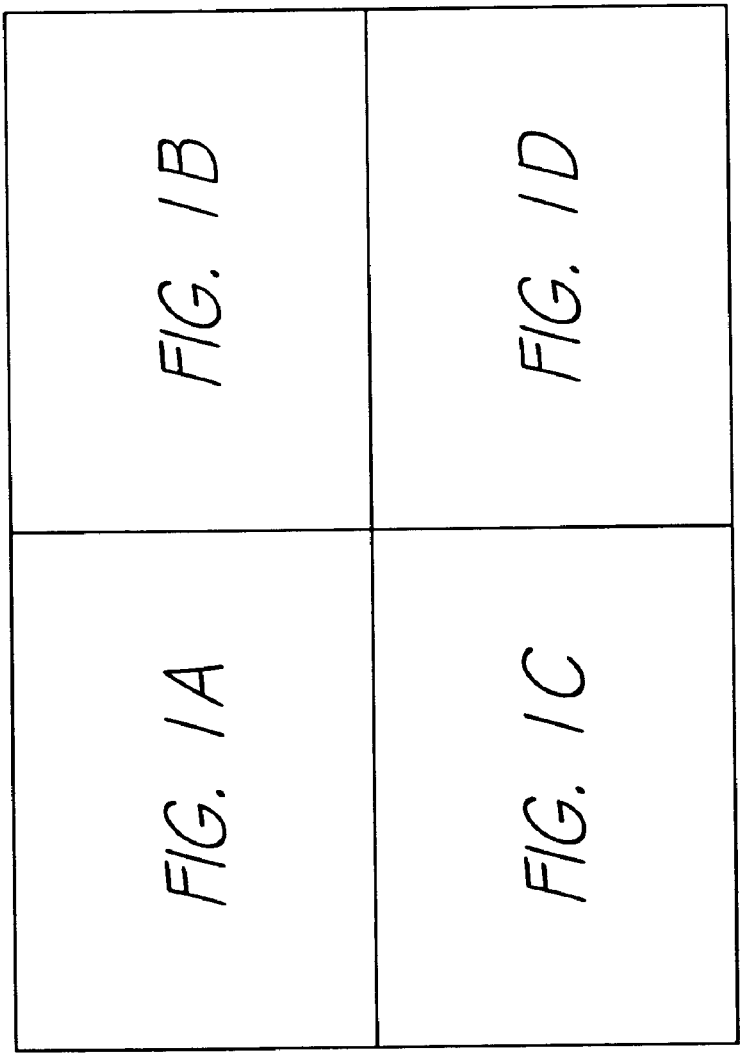
FIG. 1 is a diagram of a distributed control network with two data buses as known in the prior art.
Figure 1A:
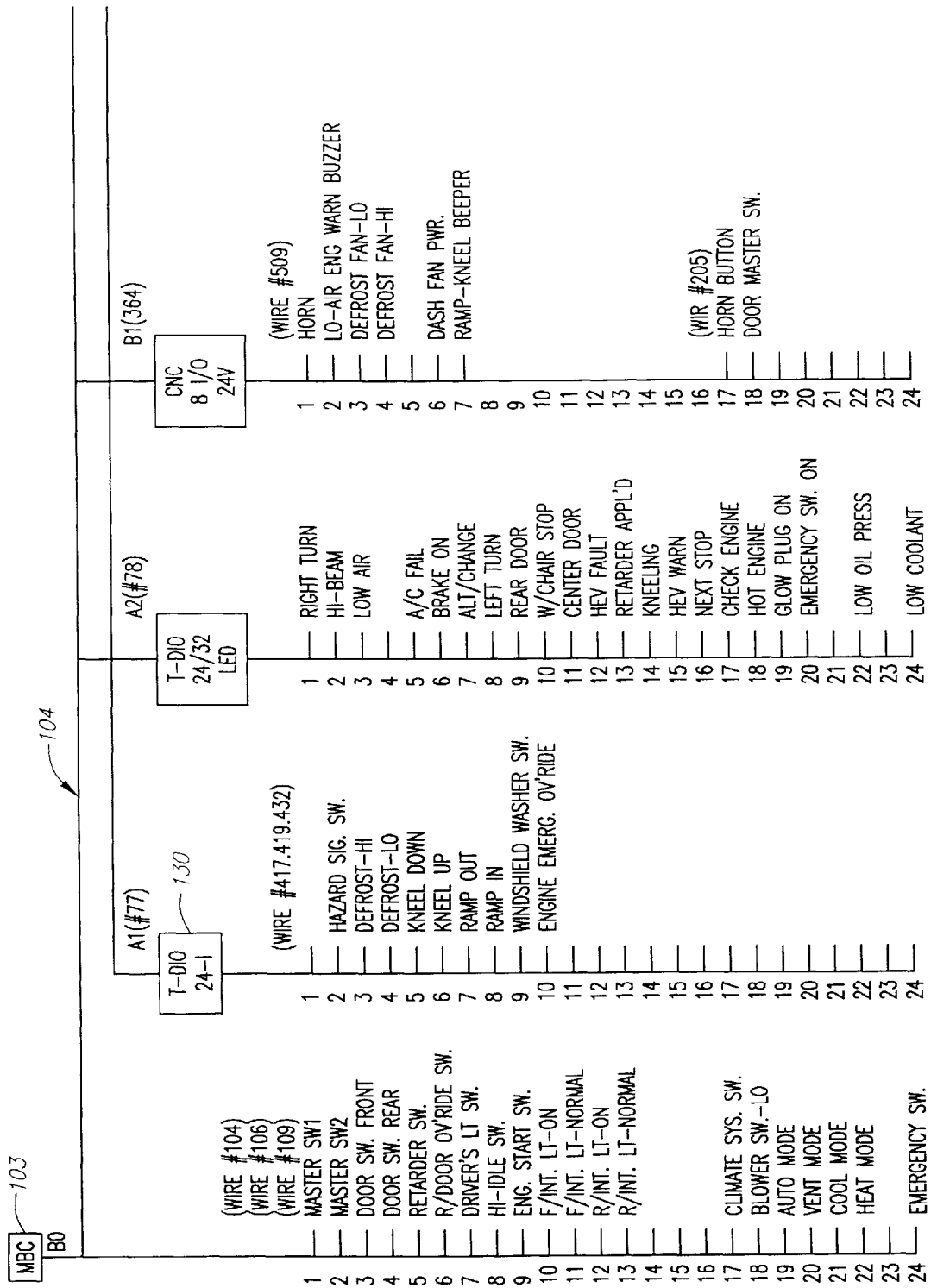
Figure 1B:
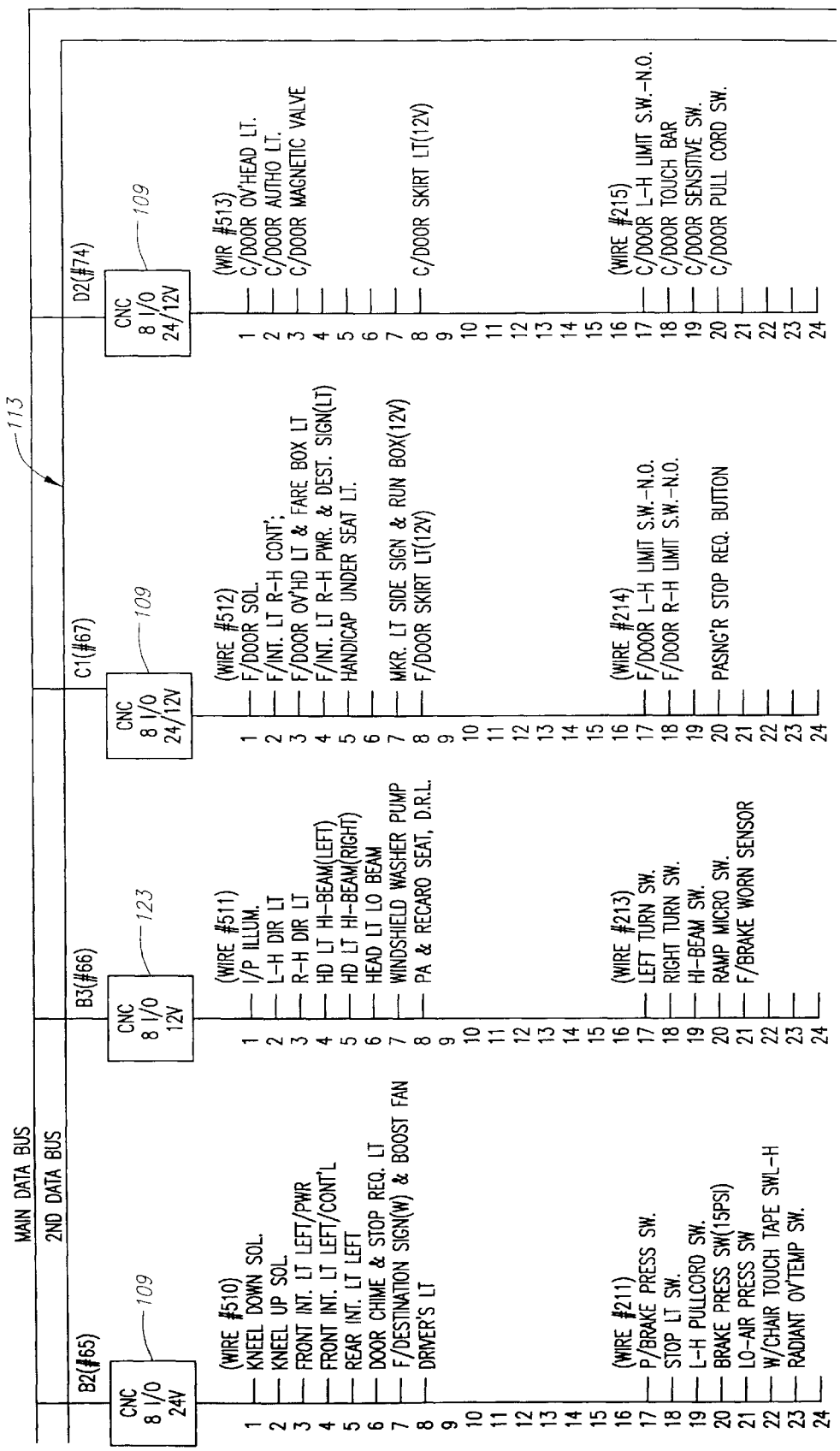
Figure 1C:
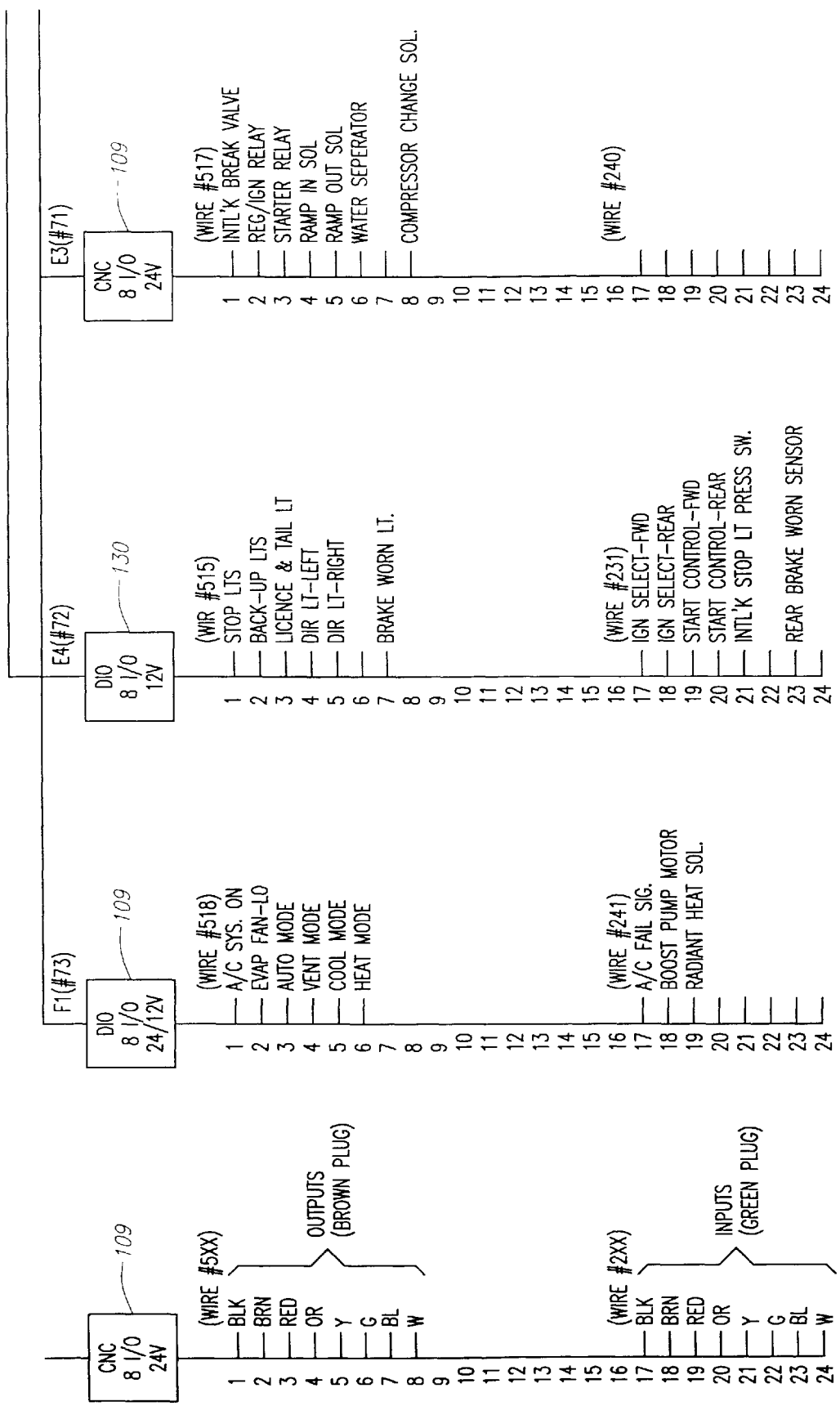
Figure 1D:
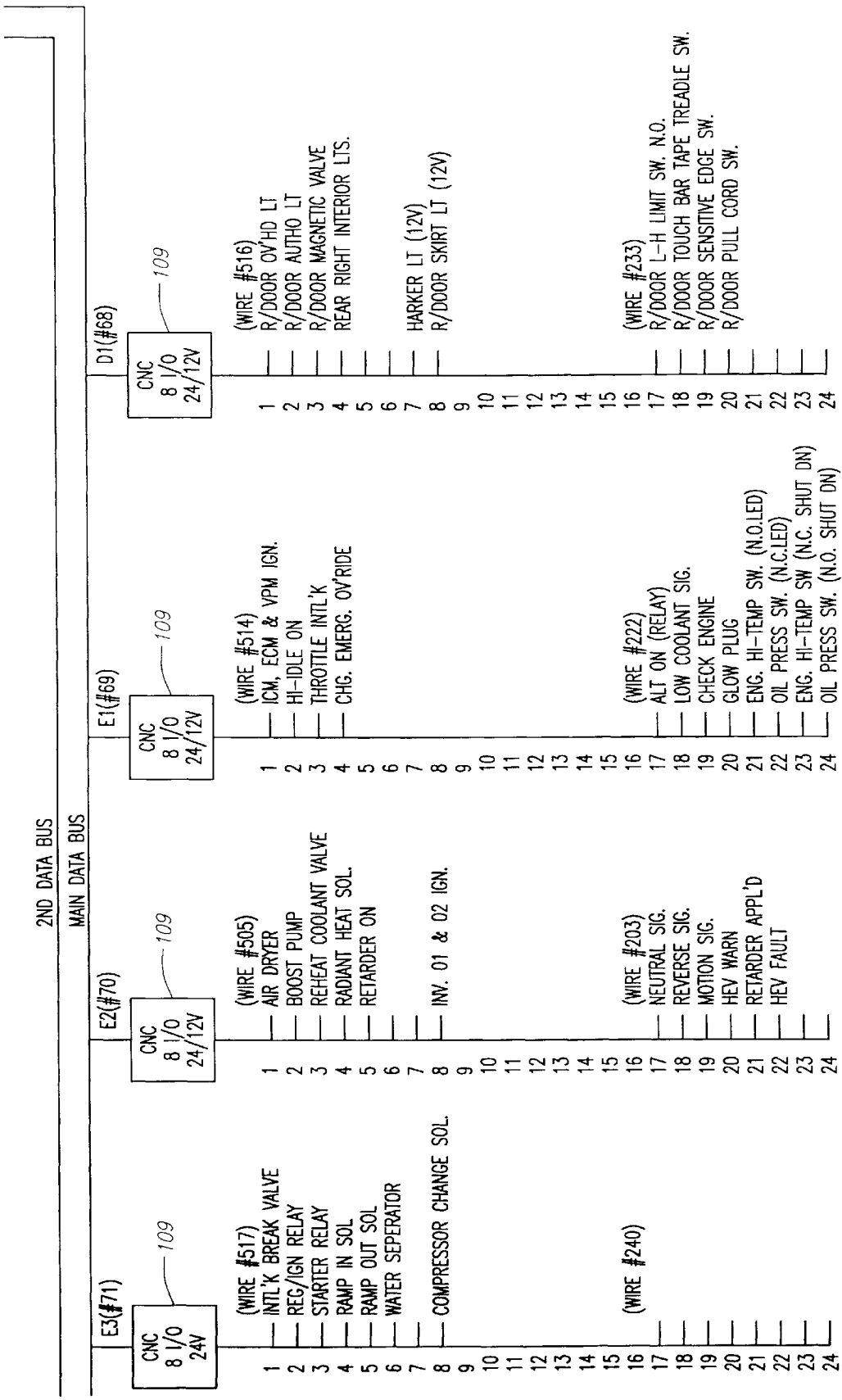

FIG. 1 is a block diagram showing the interconnection of nodes in a particular type of control network 101 as known in the art. The control network 101 comprises a main data bus controller 103 which is connected over a main data bus 104 to a plurality of first-tier slave nodes 109 and 123. One first-tier slave node 123 connected to the main data bus 104 also functions as a second data bus controller, and is connected to a second data bus 113. The second data bus controller 123 is connected over the second data bus 113 to a plurality of second-tier slave nodes 130. The main data bus 104 forms a high-speed, bi-directional communication link between the main data bus controller 103 and the first-tier slave nodes 109 and 123, and the second data bus 113 forms a low-speed, bi-directional communication link between the second data bus controller 123 and the second-tier slave nodes 130.

The nature of the slave nodes 109, 123 and 130 depends in part on the control application for which they are deployed. In a transit vehicle or railcar, for example, the master data bus controller 103 and the slave nodes 109, 123 and 130 may each be assigned to control a particular section of the vehicle or railcar, or may be assigned to control particular input and output functions. For each slave node 109, 123 and 130 in FIG. 1, various control signals are shown connected to the nodes such as to illustrate one exemplary arrangement of control functionality.

In operation, the main controller 103 communicates with the first-tier slave nodes 109 and 123 using the main data bus 104 as a high speed bi-direction link. An exemplary baud rate for communications over the main data bus 104 is 256k. The main data bus controller 103 is generally responsible for delegating control commands to the first-tier slave nodes 109 and 123, and for responding to status information and events communicated to the main data bus controller 103 over the main data bus 104. Each of the first-tier slave nodes 109 and 123 receives commands from the main data bus controller 103, and issues appropriate commands. over their respective control lines. In a similar manner, the second data bus controller 123 communicates with the second-tier slave nodes 130 using the second data bus 113 as a low speed bi-direction link (having a baud rate of, e.g., 9.6k), and instructs the second-tier slave nodes 130 to carry out certain control functions, or responds to status messages or events relayed to the second data bus controller 123 from the second-tier slave nodes 130.

Figure 2:
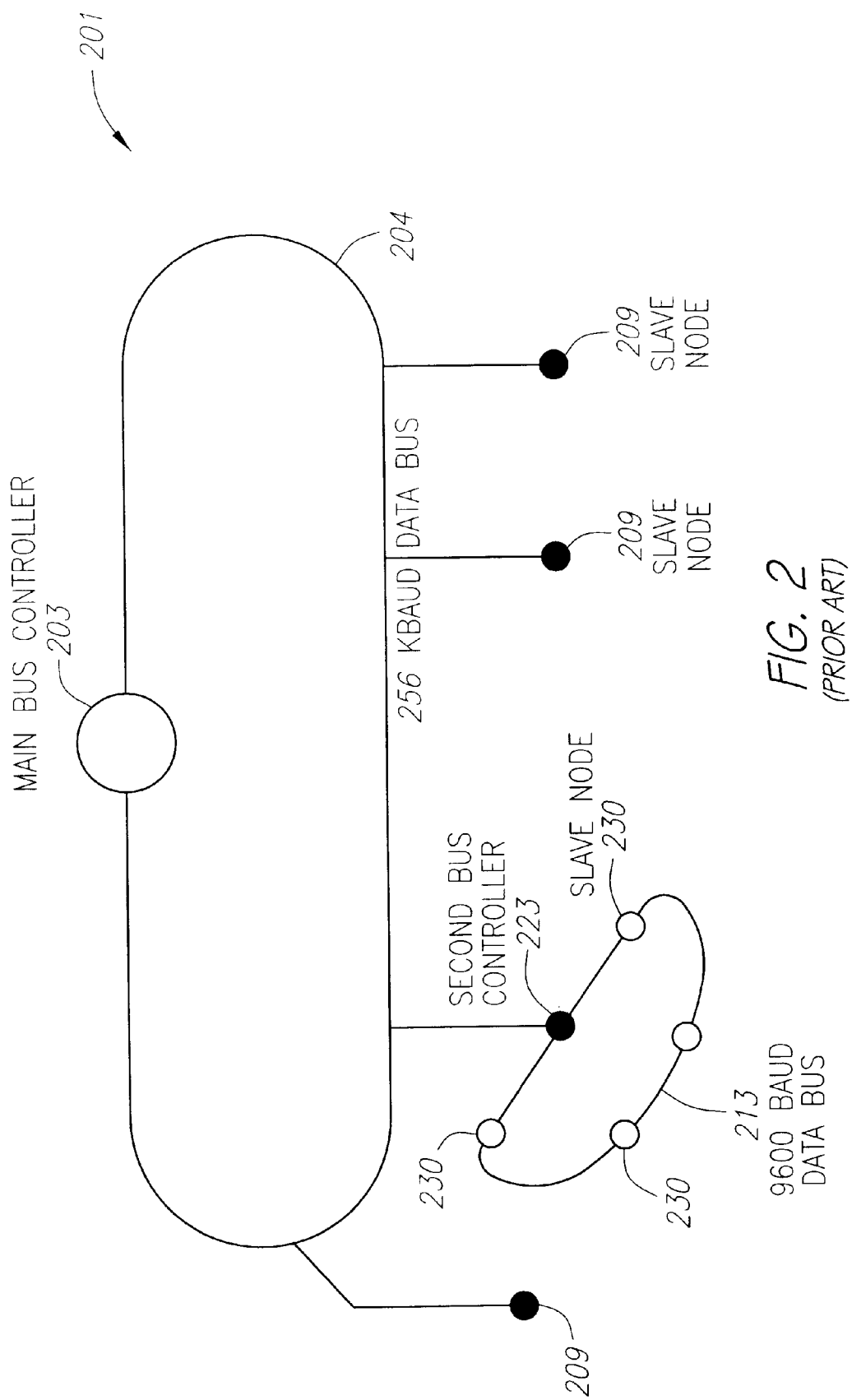
FIG. 2 is another diagram of a distributed control network having a two data buses each configured in a loop configuration as known in the prior art.

FIG. 2 is a diagram showing the layout or architecture of the FIG. 1 control network. The control network 201 shown in FIG. 2 comprises a main data bus controller 203 which is connected to a main data bus 204. The main data bus 204 is physically connected to a plurality of first-tier slave nodes 209 and 223. As explained with respect to the control network 101 shown in the FIG. 1, one of the first-tier slave nodes 223 also functions as a second data bus controller 223, and is connected over a second data bus 213 to a plurality of second-tier slave nodes 230. The main data bus 204 is configured in a loop such that it passes through each of the first-tier slave nodes 209 and 230 and returns to rejoin the main data bus controller 203. In this way, should the wires of the main bus 204 become severed, the main data bus controller 203 will still be connected to the first-tier slave nodes 209 and 223 and will not necessarily lose control over the system. Similarly, the second data bus 213 is configured in a loop such that it passes through each of the second-tier slave nodes 230 and returns to rejoin the second data bus controller 223, thereby providing an architecture resilient to potential severing of the wires of the second data bus 113. Each of the main data bus controller 203, first-tier slave nodes 209 and 223, and second-tier slave nodes 230 may be connected to a plurality of control signals for performing control or sensor functions, or various other input and output functions as necessary for the particular control application.

The control network 201 shown in FIG. 2 thus utilizes a dual-bus architecture to perform control functions. Because of the hierarchical architecture of the control system 201, relatively low baud rates on the second data bus 213 can be tolerated, leading to reduced system size, cost and complexity over traditional non-hierarchical, relay-based systems. The slower speed on the secondary data bus 213 also reduces the system's susceptibility to electromagnetic interference, a potential problem in certain control system environments (such as railcars).

Figure 3:
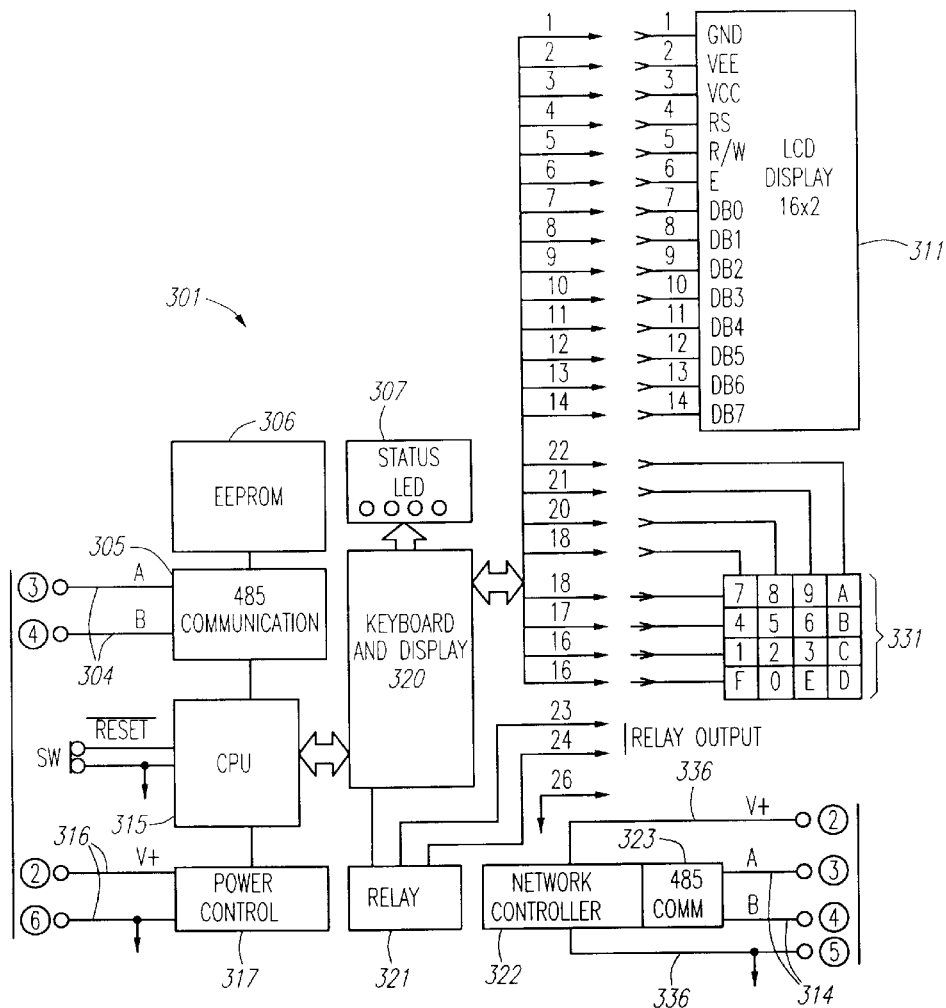
FIG. 3 is a circuit block diagram of a node that may be employed in the distributed control network of FIG. 1 or FIG. 2.

Each node, whether master data bus controller 203, first-tier slave node 209 or 223, or second-tier slave node 230, includes means for performing computations necessary for its functionality, and is configured with components such as a central processing unit (CPU) and memory. FIG. 3 is a more detailed block diagram of a node 301 (such as the master data bus controller 203, a first-tier slave node 209 or 223, or a second-tier slave node 230) that may be employed in the control network of FIG. 2. The node 301 comprises a CPU 315 connected to a power control block 317 and a transceiver 305. The node 301 is also connected to power signal lines 316, which connect to the power control block 317. The node 301 may communicate over communication signal lines 304, which are connected to the transceiver 305. An electrical erasable programmable read-only memory (EEPROM) 306 stores programming information utilized by the CPU 315 for carrying out certain programmable functions. The CPU 315 has access to a random access memory (RAM) (not shown) and read-only memory (ROM) (not shown) as needed for the particular application.

The CPU 315 is connected to a keyboard and display interface block 320. The keyboard and display interface block 320 is connected to status LEDs 307, relays 321, and LED display 311 and a keypad 331. The node 301 is thereby can accept manual inputs (e.g., from the keypad 331) or receive sensor inputs (e.g., over relays 321), and can display operational status using status LEDs 301 or LCD display 311.

The node 301 further comprises a network controller 322 which preferably comprises a second CPU. The network controller 322 is connected to a second transceiver 323 which is connected to a second pair of communication signal lines 314. The network controller also outputs power signal lines 336.

In operation, node 301 may communicate over two different data buses using transceivers 305 and 323. Thus, node 301 may communicate over a first data bus (such as data bus 204 shown in FIG. 1) by receiving and transmitting signals over communication signal lines 314 using transceiver 323, under control of the network controller 322. The node 301 may communicate over a second data bus (such as data bus 213 shown in FIG. 2) by transmitting and receiving signals over communication signal lines 304 using transceiver 305, under control of CPU 315. The CPU 315 and network controller 322 may transfer information back and forth using a shared memory (not shown). The node 301 may serve as both a "slave" unit with respect to the first data bus 204 and a "master" unit with resect to the second data bus 213. By interconnecting a plurality of nodes 301 in an appropriate configuration, a hierarchical control network with two data buses (as shown in FIG. 2) may be established.

Figure 4:
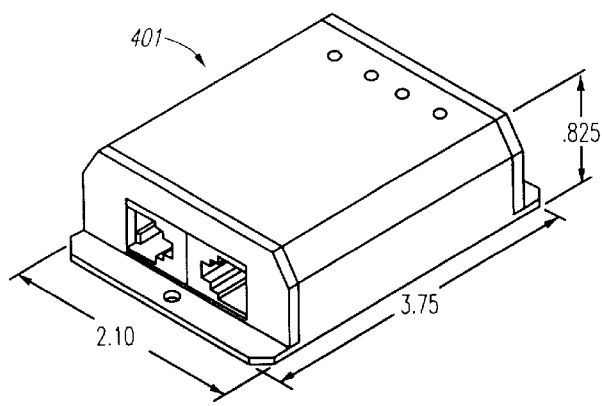
FIG. 4 is a diagram showing a physical encasement of the node shown in FIG. 3.

Each node 301 such as shown in FIG. 3 is housed in a rugged, potted case made of a suitable lightweight material such as aluminum that provides environmental protection and allows for heat dissipation. FIG. 4 is a diagram showing an exemplary physical casing 401 of a module or node 301 such as shown in FIG. 3. The casing 401 can be quite small; in the example of FIG. 4, the casing 401 measures approximately 2.1" by 3.75", and is 0.825" in thickness.

A problem that can occur in operation of a control network such as shown in FIG. 2 is that if the master data bus controller 203 fails then operation of the entire system could be jeopardized. A possible solution would be to provide a redundant master data bus controller that has the same functionality as the primary master data bus controller 203 in all respects. Upon detecting a failure of the primary master data bus controller 203, the backup master data bus controller could shut down the primary master data bus controller 203 and take over control of the network.

While having such a separate, redundant master data bus controller for backup purposes may provide a solution where the primary master data bus controller 203 fails, it falls short of being a complete solution. As an entirely separate controller having complete functional and hardware redundancy of the primary master data bus controller 203, incorporation of the backup master data bus controller effectively doubles the cost of implementing the master data bus controller 203. Also, another drawback is that if both the master data bus controller 203 the backup master data bus controller fail, then operation of the entire system would be jeopardized and operation could come to complete halt.

In addition to the possibility of the master data bus controller 203 failing, the second data bus controller 223 could also be subject to failure. While a redundant second data bus controller for backup purposes could be provided, the cost of implementing the second data bus controller would be essentially doubled, and the system is still subject to potentially complete failure should the second data bus controller also fail. Moreover, adding redundant data bus controllers could complicate the wiring of the system.

A preferred embodiment of the invention overcomes one or more of the above problems by providing redundant backup control for the master data bus controller 203 or other type of master node, the second data bus controller 223 or similar types of nodes, and, if further nested control levels exist (as described, for example, in later embodiments herein), other sub-controllers for those control levels.

Figure 5:
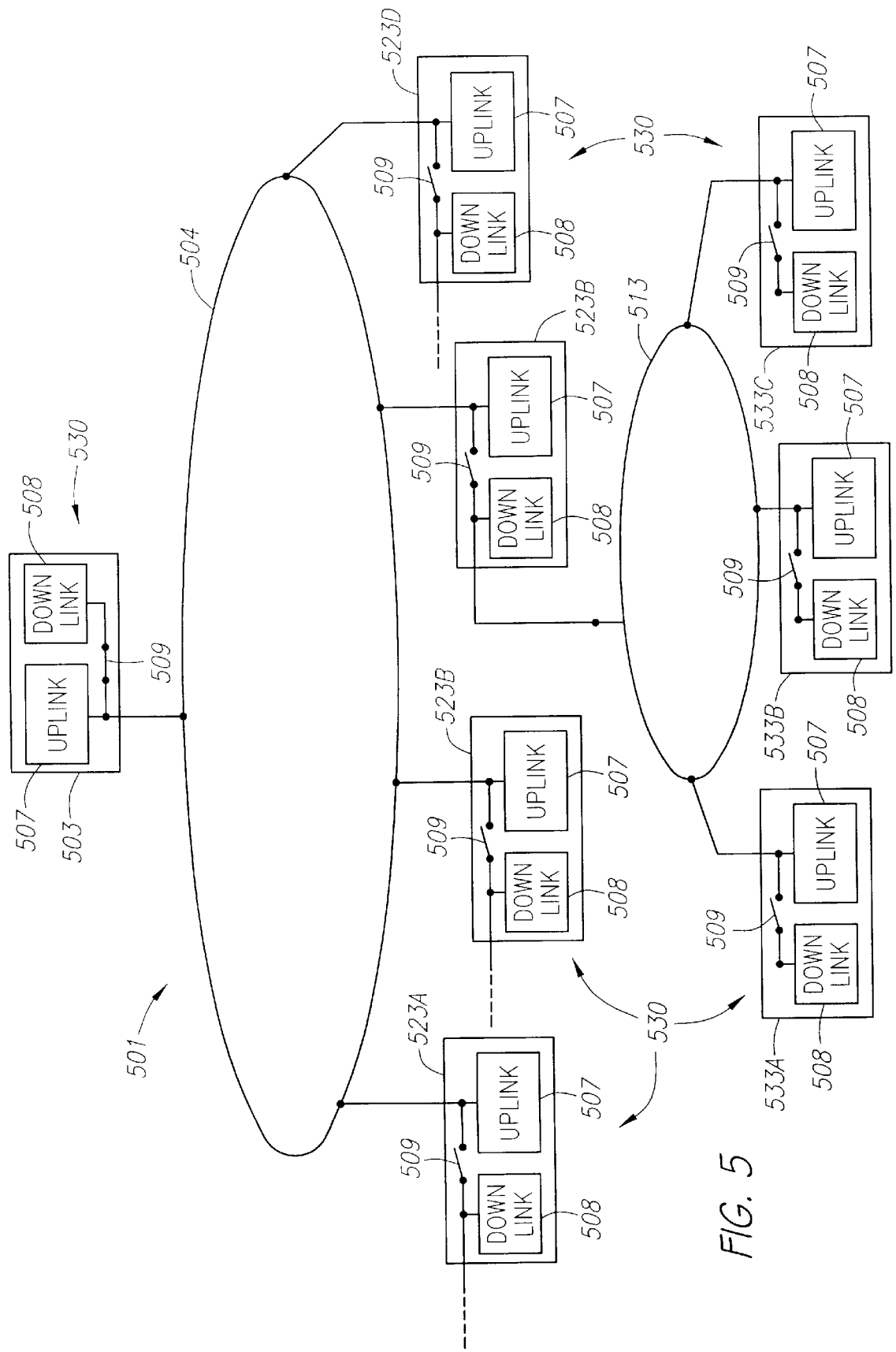
FIG. 5 is a block diagram of a preferred control network architecture in accordance with one or more aspects of the present invention.

FIG. 5 is a block diagram of a preferred embodiment of a control network 501 having redundant backup control capability for a master node at each bus level of the control network 501. Hereinafter, the node acting as the master bus controller for a particular bus will be referred to as the "master node" for that particular bus, and all the other nodes on that bus will be referred to as "slave nodes" for that particular bus. In the control network shown in FIG. 5, a master node 503 and a plurality of first-tier slave nodes 523 are connected to a main data bus 504. In a preferred embodiment of the invention, each of the slave nodes 523 is configured or can be configured to control a secondary data bus. For example, the first-tier slave node 523c is shown connected to a secondary data bus 523 in the control network 501. The first-tier slave node 523c functions as a second-tier master node with respect to second-tier slave nodes 533 connected to the secondary data bus 513. Others of the first-tier slave nodes 523 can also serve as second-tier master nodes and be connected to different secondary buses having additional second-tier slave nodes. A multi-level or multi-tiered hierarchical control network is thereby established.

Each of the master node 503, first-tier slave nodes 523, second-tier slave nodes 533, and other lower-level slave nodes (not shown in FIG. 5) are referred to hereinafter generically as "nodes" and are designated as nodes 530 in FIG. 5. In one aspect of a preferred embodiment as shown in FIG. 5, each of the nodes 530 has substantially the same hardware configuration and can therefore function as either a master node or a slave node, depending upon how the control network 501 is configured. Each data bus, along with the nodes attached to it, are generally referred to as a cell, and the master node connected to the data bus is referred to as a "cell controller" for that particular cell. As explained in more detail hereinafter, each node 530 configured as a master node transmits and receives messages over the data bus for the cell it controls. Each node 530 configured as a slave node remains in a listen mode, receiving but not transmitting messages over that data bus, unless specifically requested to transit information over the data bus by the master node. Any number of the slave nodes can, even though operating as a slave node with respect to an upper tier, be simultaneously operating as a master node with respect to other lower-tier slave nodes at a different cell sub-level.

A preferred embodiment of the invention, as noted, comprises a mechanism for redundant backup control of any node functioning as a master node at any level or sub-level of the control network 501. As generally described, in operation of a preferred embodiment of the invention the slave nodes connected to a particular data bus monitor the data bus while in a listen mode and await periodic signals from the master node for that data bus. Upon a failure to receive a signal from a master node within an expected time, the slave nodes connected to that data bus begin a wait period (which is preferably a different wait period for each slave node connected to the data bus). When the wait period elapses, the slave node determines that a failure in the master node for the particular data bus has occurred, and takes steps to take over the functionality of the master node. Each of the slave nodes is programmed with a different wait period, so that there is no contention for replacing the master node when a master node failure has occurred. In one aspect, backup control of each master node is prioritized, such that there is a specific order in which the slave nodes can potentially take over control of the master node functionality when a failure has occurred.

In more detail, again with reference to FIG. 5, one of the nodes 530 attached to the main data bus 504 is configured as a master node 503. The other nodes 530 attached to the main data bus 504 (in this example numbering four such nodes 530) are configured as first-tier slave nodes 523, meaning that they receive but do not transmit master-control signals over the main data bus 504. The first-tier slave nodes 523 may, however, from time to time send responsive signals or status signals over the main data bus 504.

In a preferred embodiment, each of the first-tier slave nodes 523 may be configured as a second-tier master node controlling a secondary bus. One such example is shown in FIG. 5, wherein first-tier slave node 523c is connected to a secondary data bus 513. A plurality of other nodes 530 are also attached to the secondary bus data 513, and serve as second-tier slave nodes 533. There are three such second-tier slave nodes 533 in the example shown in FIG. 5. With respect to the secondary data bus 513, the first-tier slave/second-tier master node 523c transmits master-control signals to the second-tier slave nodes 533. The second-tier slave nodes 533 ordinarily operate only in a listen mode, but from time to time may send responsive messages or status messages to the second-tier master node 523c. The other first-tier slave nodes 523a, 523b and 523d may similarly be connected as second-tier master nodes (i.e., cell controllers) each controlling its own secondary bus or cell.

While the control network 501 shown in FIG. 5 has four first-tier slave nodes 523 and three second-tier slave nodes 533, the number of first-tier slave nodes 523 and second-tier slave nodes 533 is limited only by the ability of the master node to communicate with the slave nodes over the particular data bus. There may be more slave nodes or fewer slave nodes on each bus than shown in the control network 501. In a preferred embodiment, there are no more than eight such cell controllers, although more than eight may be used so long as processing capacity and speed limit.

In addition, further levels of control nesting beyond two data buses may also be provided, using a similar approach to the two data bus method. Thus, for example, one or more of the second-tier slave nodes 533 may be configured as a third-tier master node controlling its own tertiary or third-tier data bus. While FIG. 5 only shows two nested control levels, the same control concepts would apply to a control network architecture having additional nested control levels.

In a preferred embodiment, communication over the main data bus 504 and the secondary data bus 513 (or buses, if appropriate) is time-multiplexed such that only one node 530 is transmitting over a particular data bus at a given time. Usually, each transmitted message will be targeted for a specific destination node 530, which may be specified by address bits in the transmitted message. However, in some embodiments broadcast messages may also be used targeted to multiple nodes 530.

Responsibilities for tasks, or groups of tasks, may be assigned to specific nodes 530. For example, each of the first-tier slave nodes 223 may be assigned a distinct sphere of responsibility. Similarly, each of the second-tier slave nodes 533 may be assigned a distinct sphere of responsibility. Examples of tasks that may be assigned to different nodes 530 are described for an exemplary control network later herein, with respect to FIG. 9.

Each of the nodes 530 preferably comprises an uplink transceiver 507, a downlink transceiver 508, and a switch 509. Each of the nodes 530 receives signals over its downlink transceiver 508. Over the main data bus 504, the first-tier master node 503 transmits master-control signals to each of the first-tier slave nodes 523. From time to time, according to the programmed control protocol, the first-tier slave nodes 523 respond to the master-control signals, or otherwise send status messages to the first-tier master node 503 when events occur specific to that first-tier slave node 523. Otherwise, the first-tier slave nodes 523 do not ordinarily communicate with each other.

In a similar manner, over each secondary data bus (such as secondary data bus 513), the second-tier master node 523 (for example, first-tier slave/second-tier master node 523c in FIG. 5) transmits master-control signals to each of the second-tier slave nodes 533 connected to the same secondary data bus. From time to time, according to the programmed control protocol, the second-tier slave nodes 533 respond to the master-control signals, or otherwise send status messages to the second-tier master node 523c when events occur specific to that second-tier slave node 533. Otherwise, the second-tier slave nodes 523 do not ordinarily communicate with each other.

Communication between nodes is preferably carried out using half-duplex time division multiplexing. In typical operation, the master node polls each of the slave nodes periodically. Each of the nodes is preferably provided with a unique node identification number or address that distinguishes it from all other nodes of the control network. The master node sends a control message to each slave unit in turn, using the node identification number or address to identify the intended destination. Each of the slave nodes receives the control message but only reacts if it recognizes its own node identification number or address in the control message. The slave node takes the actions requested by the control message received from the master node. Within a designated time period after receiving the control message, the slave node responds to the master node with an acknowledgment message. Each of the slave nodes are polled in turn so that the master node can keep track of events happening throughout the system.

A communication protocol is preferably established so as to avoid collisions on each of the data buses. A simple and effective communication protocol is one in which the master node for the particular data bus sends a control message to a particular slave node, which responds with an acknowledgment or status message within a predetermined amount of time before the master node contacts another slave node. Slave nodes generally do not initiate communication without being first polled by the master node. The master node may also send out a broadcast control message that is intended for receipt by more than one of the slave nodes. The broadcast control message can comprise a node identification number or address that instructs a single particular node to respond to the broadcast control message. Usually, the single node selected for response will be the most critical node requiring receipt of the broadcast control message.

Failure of the current master node (at any of the control levels) commonly results in the master node either failing to transmit, or else transmitting improper control information to the slave nodes over the data bus. According to a preferred redundant backup control protocol, the slave nodes periodically receive master-control messages from the master node and, in the event that proper master-control messages fail to appear, initiate a failure mode response procedure.

Figure 6:
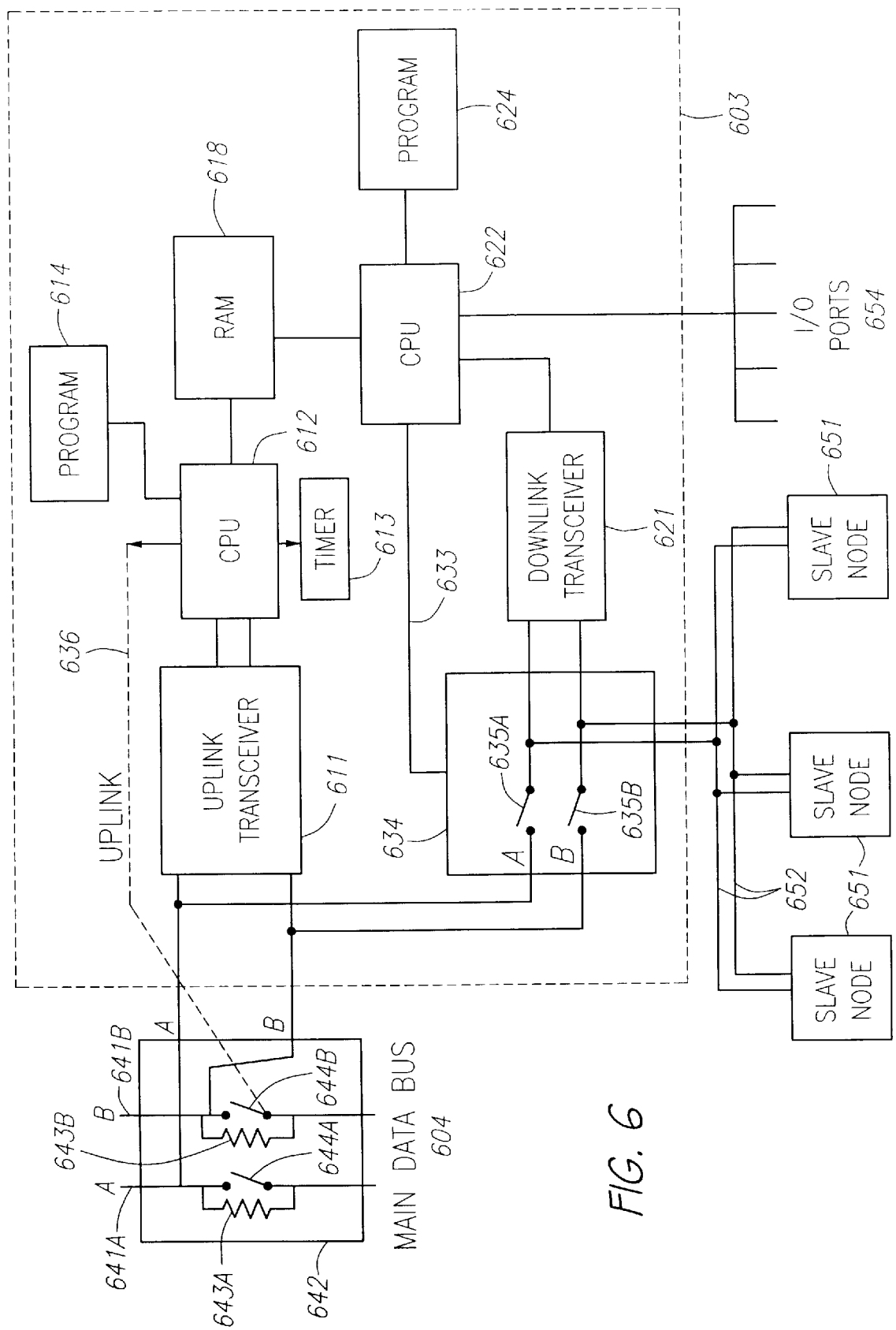
FIG. 6 is a block diagram of a preferred node within the control network architecture shown in FIG. 5.

Detection of and response to a failure mode condition may be explained in greater detail with reference to FIG. 6, which is a block diagram of a preferred embodiment depicting most of the main components of a node (such as any of nodes 530 shown in FIG. 5). Because failure mode detection and response is carried out by a node 530 operating as a slave node, the following discussion will assume that the node 603 shown in FIG. 6 is initially configured as a slave node. Further, for simplicity of explanation, it will be assumed that the node 603 shown in FIG. 6 is a first-tier slave/second-tier master node connected to a main bus and a secondary bus (such as first-tier slave/second-tier master node 523c connected to the main data bus 504 and secondary data bus 513 in FIG. 5), although the same node circuit configuration is preferably used for each of the nodes 530, regardless of control level, for ease of construction and flexibility purposes.

In the node block diagram of FIG. 6, a node 603 is shown connected to a first bus (e.g., main bus) 604. The node 603 comprises an uplink transceiver 611, a downlink transceiver 621, a CPU 612 connected to the uplink transceiver 611, and another CPU 622 connected to the downlink transceiver 621. Both CPUs 612, 622 are preferably connected to a dual-port RAM 618, and each CPU 612, 622 is connected to a ROM program store 614 and 624, respectively. The second CPU 622 is connected through an appropriate interface to I/O ports 654, which may comprise sensor inputs, control signal outputs, status LEDs, LCD display, keypad, or other types of external connections. It will be understood that the node 603 of FIG. 6 can have all the components and functionality of the node 301 shown in FIG. 3; however, in FIG. 6 only certain basic components needed for explaining the operation of the invention are depicted.

Each node 603 is preferably capable of both sending and receiving messages (e.g., control instructions). Typically, the uplink transceiver 611 operates in a "slave" mode whereby the node 603 receives control instructions using the uplink transceiver 611 and then responds thereto, and the downlink transceiver 621 operates in a "master" mode whereby the node 603 issues control instructions (e.g., polls slave nodes) and awaits a response from other nodes after sending such control instructions.

The downlink transceiver 621 of the node 603 is connected to a secondary data bus 652, to which is also connected a plurality of second-tier slave nodes 651 (assuming the node 603 is a first-tier slave/second-tier master node). The node 603 thereby functions as a first-tier slave node with respect to the main data bus 604, receiving with its uplink transceiver 611 first-tier master-control signals over the main bus 604 from a first-tier master node (such as master node 503 shown in FIG. 5), and also functions as a second-tier master node with respect to the secondary data bus 652, transmitting second-tier master-control signals with its downlink transceiver 621 to second-tier slave nodes 651.

The node 603 also comprises a pair of switches 635a, 635b connected between the downlink transceiver 621 and the signal lines 643a, 643b of the main data bus 604. In normal operation, the switches 635a, 635b remain open (unless the node 503 is also the first-tier master node, such as master node 503 shown in FIG. 5, in which case the switches 635a, 635b would be closed), and the downlink transceiver 611 is thereby isolated from the main data bus 604. However, when a first-tier master node failure condition is detected, switches 635a, 635b are closed, enabling the downlink transceiver 621 to take over for the first-tier master node. The downlink transceiver 621 would therefore function simultaneously as master node with respect to both the main data bus 604 and the secondary data bus 652.

In a preferred embodiment, detection of a master node failure condition on the main data bus 604 is accomplished using a timer mechanism, such as a hardware timer 613 accessible (either directly or indirectly) by the CPU 612 that is connected to the uplink transceiver 611. According to a preferred control protocol (assuming the node 603 is a first-tier slave/second-tier master node), the uplink transceiver 611 of node 603 receives first-tier master-control signals periodically from the first-tier master node (such as master node 503 in FIG. 5). The master-control signals may, for example, request status information from the node 603, or instruct the node 603 to carry out certain control or input/output functions. The node 603 ordinarily responds by carrying out the requested functions and/or sending an acknowledgment or status signal to the first-tier master control node using the uplink transceiver 611.

Timer 613 times out a wait period between master-control signals received from the first-tier master control node. In a preferred embodiment, each time the uplink transceiver 611 receives a master-control signal from the first-tier master node that is recognized as an appropriate master-control signal within the particular programmed control protocol (whether or not the master-control signal is died to the particular node 603), the CPU 612 connected to the uplink transceiver 611 resets the timer 613. If the timer 613 ever times out, then CPU 612 responds by asserting a failure mode response procedure. The timing out of timer 613 may result in an interrupt to CPU 612 in order to inform the CPU 612 of the failure to receive master-control signals, or else the CPU 612 may periodically monitor the timer 613 and, when the CPU 612 notices that the timer 613 has timed out, assert a failure mode response procedure.

When a failure mode condition is detected, the CPU 612 sets a failure mode status bit in a predetermined flag location within the dual-port RAM 618. The other CPU 622 periodically monitors the failure mode status bit in the dual-port RAM 618 and is thereby informed when a failure occurs. Alternatively, instead of the CPUs 612, 622 communicating through the dual-port RAM 618, timer 613 can directly inform CPU 622 when a failure to receive master-control signals has occurred (i.e., when timer 613 has timed out).

When the CPU 622 has been informed or otherwise determined that a failure mode condition exists, and that the first-tier master node has presumably failed, the CPU 622 sends a signal over control line 633 to close switches 635a, 635b, thereby connecting the downlink transceiver 621 to the main bus 604. From that point on, the CPU 622 performs as the first-tier master node with respect to the main bus 604. The node 603 can continue to receive information over the main data bus 604 using the uplink transceiver 611. Alternatively, the node 603 may thereafter perform all transmission and reception over both the main bus 604 and the secondary bus 652 using the downlink transceiver 621. When the failure mode is entered, the CPU 622 may be programmed so as to directly carry out the I/O port functions for which it previously received instructions from the first-tier master node, or the node 603 may send master-control signals to its own uplink transceiver 611 and thereby continue to carry out the I/O port functions as it had previously been doing. In other words, the node 603 can give itself control instructions over the main data bus 604 so that it can continue to perform its previously assigned functions. If, after taking over for the first-tier master node, the node's downlink transceiver 611 should fail, the node 603 can still continue to perform its control functions when the next slave node takes over control as the new first-tier master node (as later described herein), because its uplink transceiver 611 continues to function in a normal manner.

According to the above described technique, the node 603 thereby substitutes itself for the first-tier master node upon the detection of a first-tier master node failure as indicated by the failure to receive the expected first-tier master-control signals. Should the node 603 fail, either before or after taking over control for the first-tier master node, the next first-tier slave node would take over and become the first-tier master node in a similar manner to that described above.

Referring again to FIG. 5, the order in which the first-tier slave nodes 523 take over for the first-tier master node 503 is dictated by the wait period timed out by the timer 613 of the particular first-tier slave node 523. The timer 613 (see FIG. 6) for each first-tier slave node 523 is programmed or reset using a different time-out value. A first-tier slave node 523 only asserts a failure mode condition when its internal timer 613 reaches the particular timeout value programmed for that particular node 523.

While the programmed wait periods for the internal timer 613 in each first-tier slave node 523 can vary depending upon the control application, illustrative wait periods are programmed in ten millisecond increments. Thus, for example, first-tier slave node 523a could be programmed with a 10 millisecond wait period; the next first-tier slave node 523b could be programmed with a 20 millisecond wait period; the next first-tier slave node 523c could be programmed with a 30 millisecond wait period; and the last first-tier slave node 523d could be programmed with a 40 millisecond wait period; and so on. First-tier slave node 523a would take over as the first-tier master node if 10 milliseconds elapses without it receiving any proper first-tier master-control signals; the next first-tier slave node 523b would take over as the first-tier master node if 20 milliseconds elapses without it receiving any proper first-tier master-control signals; the next first-tier slave node 523c would take over as the first-tier master node if 30 milliseconds elapses without it receiving any proper first-tier master-control signals; and so on.

Use of 10 millisecond increments for the wait periods in the above example is considered merely illustrative, and the actual wait periods should be selected depending upon the time criticality of the control messages, and the number of messages that may be missed before a high enough degree of certainty is established that the master node has failed. For example, if a slave node expects to observe a control-message signal on the data bus no later than every 5 milliseconds, then the slave node may be programmed to assert a failure mode condition after a wait period corresponding to the absence of a predefined number of messages—for example, twenty messages (i.e., 100 milliseconds). If critical aspects of the system requiring master node control need to be serviced in a shorter time period, then the wait period would have to be reduced to accommodate the time-sensitive components of the system.

The order in which the slave nodes take over for the master node need not be dictated by the relative position in the control loop of the slave node with respect to the master node, but rather may be dictated according to the programmed wait period in each slave node. Flexibility is thereby provided in the order of priority in which the slave nodes take over for the master node in the event of a failure event.

Accordingly, by use of the inventive techniques described herein, redundant backup for the first-tier master node 503 is provided. Such redundant backup control is provided without requiring additional physical nodes to be located within the control system, and without having to provide wiring for such additional physical nodes to the buses 504 or 513. The redundant backup for the master node 504 is also accomplished while resolving contention problems that might otherwise occur if each of the first-tier slave nodes 523 were programmed with the identical timeout period.

In a preferred embodiment, redundant backup control is provided in a similar manner for the secondary data bus 513, and each additional data bus that may be provided in the system. Thus, each of the second-tier slave nodes 533 is preferably configured with the circuitry shown for node 603 in FIG. 6, and each of the second-tier slave nodes 533 can therefore substitute itself for the first-tier slave/second-tier master node 523c if the first-tier slave/second-tier master node 523c fails.

If a particular node is operating as a master node for two buses as a result of a failure of the master node on a higher-tier bus, and the node operating as such fails, then it is possible that two different nodes will take over for the failed node, one node taking over on each bus. For example, supposing that first-tier slave/second-tier master node 523c has already taken over as the first-tier master node due to a failure of the master node 503, and further suppose that first-tier slave/second-tier master node 523c too fails, then the next first-tier slave node 523d would take over as the first-tier master node with respect to the main data bus 504, but the first second-tier slave node 533a would take over as second-tier master node with respect to the secondary data bus 513.

In the above manner, despite the failure of one or more nodes, substantial functionality of the control system as a whole can be maintained. A failed node is essentially discarded or bypassed to the extent possible so as to maintain the highest possible degree of continued operability. Furthermore, because certain parts of the system will continue operate despite the failure of the master node, identification of the failed node by engineers or maintenance personnel should be simplified by being able to identify the inoperative portion of the system that has become isolated due to the failure.

In one aspect, separation of responsibility in each node 603 of master functions and slave functions between two different CPU's each operating with a different transceiver allows the node 603 to potentially continue operating as either a master node or a slave node should one of the CPU's fail, providing that the failure does not disrupt both of the transceivers at the node 603.

In another aspect of the invention, a simplified single-cable wiring means is provided. The wiring means is described herein with particular reference to a two-tier hierarchical distributed control network; however, it will be appreciated by those skilled in the art that the invention also has applicability to other types of multi-tier hierarchical control networks having multiple buses.

Figures 7A, 7B:
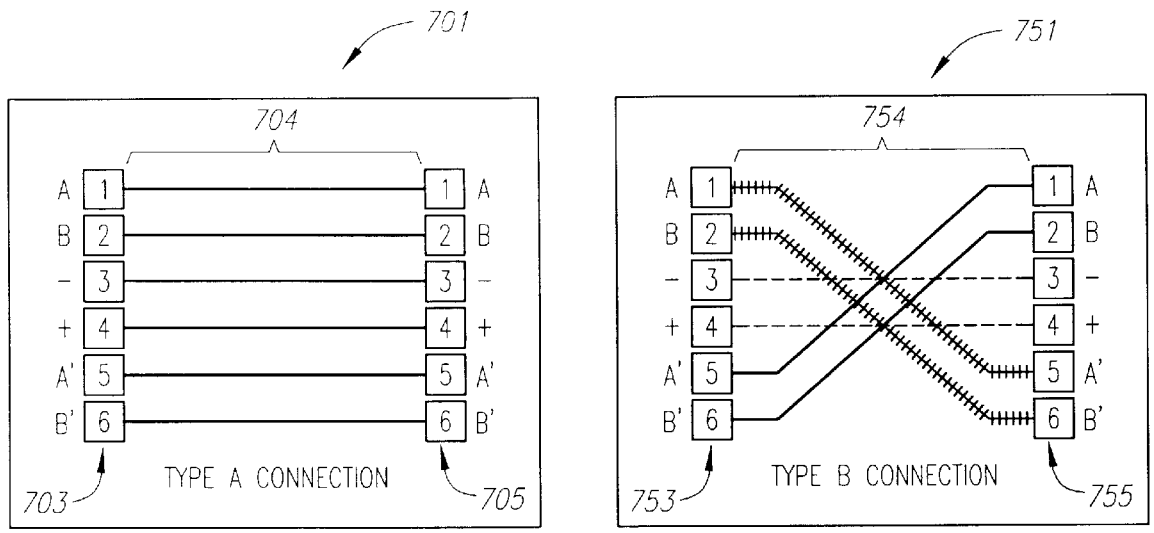
FIGS. 7A and 7B are diagrams of two different types of cable connectors.
Figure 8:
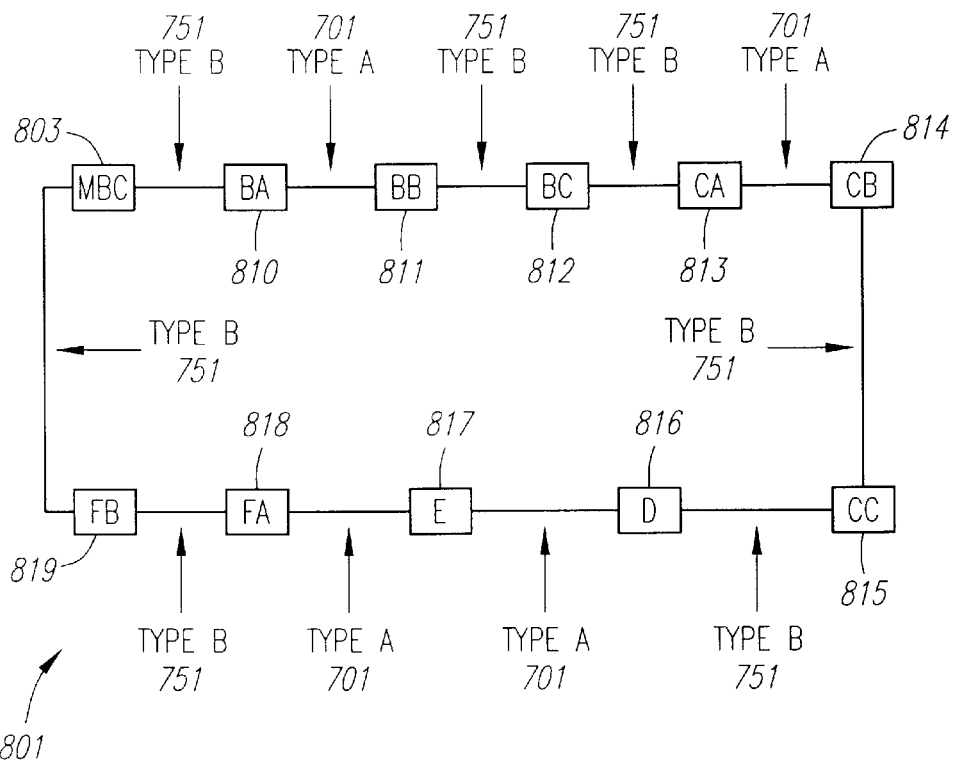
FIG. 8 is a diagram showing an example of a distributed, multi-bus control network with control nodes connected in a loop configuration in accordance with preferred aspects of the present invention.

An example of a distributed hierarchical control network 801 in accordance with one or more aspects of the present invention is depicted in FIG. 8. From a general perspective of information transfer, and as explained hereinafter more fully with respect to FIGS. 7A, 7B, 8, 9 and 10A–10C, the control network 801 comprises two data buses, one data bus allowing transfer of information among the first-tier master node and the first-tier slave nodes, and a second data bus allowing transfer of information among a single second-tier master/first-tier slave node and the second-tier slave nodes. A particular feature of the control network 801 shown in FIG. 8 is that, even though two data buses are defined, the various nodes are all interconnected in a loop using only a single cable.

Preferred cable connectors for implementing the control network 801 shown in FIG. 8 are depicted in FIGS. 7A and 7B. The first type of cable connector 701, designated a "Type A" cable connector, is shown in FIG. 7A. The Type A cable connector 701 comprises an insulated cable housing a plurality of wires 704. The Type A cable connector 701 further comprises two terminals 703, 705 located at opposite ends of the cable wires 704. Each terminal 703, 705 has a plurality of plugs (e.g., six plugs) designated as A, B, -, +, A' and B' in FIG. 7A. The wires 704 connect the six plugs of terminal 703 in a direct feed-through path to the six plugs of terminal 705. Internal to the cable connector 701, each pair of wires 704 may be a shielded, twisted pair; thus, wires 704 connecting plugs A and B may comprise a first twisted pair; wires 704 connecting plugs - and + (i.e., positive and negative power wires) may comprise a second twisted pair; and wires 704 connecting plugs A' and B' may comprise a third twisted pair.

The second type of cable connector 751, designated a "Type B" cable connector, is shown in FIG. 7B. The Type B cable connector 751, similar to the Type A cable connector 701, comprises an insulated cable housing a plurality of wires 754. The Type B cable connector 751 also comprises two terminals 753, 755 located at opposite ends of the cable wires 754. Each terminal 753, 755 has a plurality of plugs (e.g., six plugs) designated as A, B, -, +, A' and B' in FIG. 7B. The wires 754 connect the six plugs of terminal 753 in a crossover path to the six plugs of terminal 755, with plugs A and B of terminal 753 connected to plugs A' and B' of terminal 755, and plugs A' and B' of terminal 753 connected to plugs A and B of terminal 755. The crossover path may be internal to the cable, or may occur at one of the terminals 753 or 755. Internal to the cable connector 751, each pair of wires 754 may be a shielded, twisted pair; thus, wires 754 connecting plugs A and B of terminal 753 to plugs A' and B' of terminal 755 may comprise a first twisted pair; wires 754 connecting plugs - and + may comprise a second twisted pair, and wires 754 connecting plugs A' and B' of terminal 753 to plugs A and B of terminal 755 may comprise a third twisted pair.

As shown in FIG. 8, cable connectors 701 and 751 are used to connect nodes 850 in a loop pattern, with each node 850 connected to two cable connectors 761 or 751. Each node 850 comprises two terminal interfaces (not shown) each suitable for physically connecting the node to any one of terminals 703, 705, 753 and 755. Terminals 703, 705, 753 and 755 are therefore preferably physically constructed in an identical fashion so that any terminal 703, 705, 753 and 755 can plug into either of the terminal interfaces at any node 850.

The choice of which cable connector 701 or 751 to use in connecting any one node 850 with the next node 850 depends upon which of the two buses the latter node 850 is to interact with or, equivalently, which tier of the hierarchical control network the latter node 850 is associated with. If two adjacent nodes 850 are part of the same tier (i.e., communicate over the same data bus), then a Type A cable connector 701 (such as shown in FIG. 7A) is used to connect the two nodes 850. If two adjacent nodes 850 are on different tiers (i.e., use different data buses), then a Type B cable connector 751 (such as shown in FIG. 7B) is used to connect the two nodes 850.

Figure 10A:
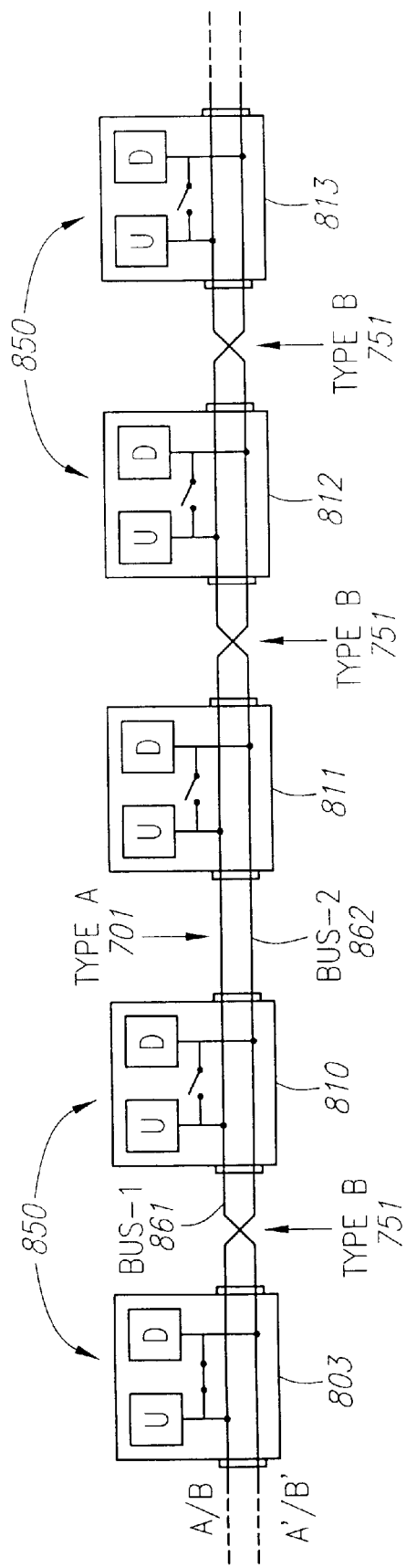
FIGS. 10A, 10B and 10C are more detailed diagrams showing the interconnection of wires of the cable connectors with the uplink and downlink transceivers of the control nodes of FIG. 8.

In operation, one pair of wires 704 (or 754) ending at terminal 701 (or 751) are connected to the uplink transceiver 611 of a node 850, and the other pair of wires 704 (or 754) ending at terminal 703 (or 753) are connected to the downlink transceiver 634 of the node. This wiring technique is shown in more detail in FIG. 10A, which corresponds to FIG. 8 but shows the actual wiring connections in more detail. In FIG. 10A, each node 850 has an uplink transceiver denoted by a "U" and a downlink transceiver denoted by a "D". Each node 850 is constructed identically, such that the downlink transceiver "D" is connected to one set of plug connections (e.g., A' and B') and the uplink transceiver "U" is connected to another set of plug connections (e.g., A and B). The power wires - and + are not shown for the sake of clarity but are assumed to be connected as well.

Cable connectors 701 and 751 are then connected between each adjacent pair of nodes 850 to connect the uplink transceivers and downlink transceivers in such a way that two different data buses are established, with the appropriate data bus connected to the appropriate downlink transceiver "D" or uplink transceiver "U" of a node 850 depending upon the node's place in the control network hierarchy. Thus, in the example of FIG. 10A, taking node 803 as the top-level or first-tier master node, the downlink transceiver "D" of the first-tier master node 803 is connected to the uplink transceiver "U" of the next adjacent node 810, allowing the first-tier master node 803 to communicate in a downlink manner with node 810 over a first bus 861. A crossover connector, or Type B cable connector 751, is used to connect the first-tier master node 803 with the next adjacent node 810 to allow the first bus 861 to be connected in such a manner. If a Type A cable connector 701 were used instead of a Type B cable connector 751, then the downlink transceiver "D" of the first-tier master node 803 would not be connected to the uplink transceiver "U" of the next adjacent node 810, which means that a suitable connection would have to be established in some other manner.

Node 810 is then connected to the next adjacent node 811 through a Type A cable connector 701. This type of connection allows the first bus 861 to be connected to the uplink transceiver "U" of the next node 811, thereby permitting downlink communication from the first-tier master node 803 to node 811. Thus, in the hierarchical network control scheme described earlier herein, nodes 810 and 811 may be viewed as first-tier slave nodes of first-tier master node 803.

Node 811 is connected to the next adjacent node 812 through a Type B cable connector 751. As a result, the first bus 861 is connected to the downlink transceiver "D" of node 812. In a preferred embodiment, the downlink transceivers "D" are used only for controlling a lower-level tier. Consequently, when two downlink transceivers "D" are connected together, no control link is established. In this case, the first-tier master node 803 therefore does not directly have a control link with node 812.

However, node 812 is connected through a Type B cable connector 751 to the next adjacent node 813, allowing the first bus 861 to be connected to the uplink transceiver "U" of node 813. The connection of the downlink transceiver "D" of the first-tier master node 803 with the uplink transceiver "U" of node 813 allows a control link to be established between the first-tier master node 803 and node 813.

Thus, in FIG. 10A the first-tier master node 803 establishes a control link with nodes 810, 811 and 813 over the first date bus 861.

A second bus 862 is used to establish a control link between one of the nodes 850 and the second-tier slave nodes. In the example of FIG. 10A, any of the first-tier slave nodes 810, 811 or 813 may be designated as the second-tier master node to exercise control using the second data bus 862. Selection of the second-tier master node is a matter of programming of the nodes 850.

As an example, node 811 may be designated as the second-tier master node. The downlink transceiver "D" of node 811 is connected to the uplink transceiver "U" of the next adjacent node 812, thereby establishing a control link between the second-tier master node 811 and node 812. A Type B cable connector 751 is used to connect nodes 811 and 812 to allow the downlink transceiver "D" of node 811 to be connected to the uplink transceiver "U" of node 812. At the same time, the Type B cable connector 751 causes the first data bus 861 to bypass node 812 and reach other nodes 850 downstream.

Node 812 is connected to node 813 through a Type B cable connection 751. As a result, the second data bus 862 bypasses the uplink transceiver "U" of node 813, but the first data bus 861 is connected to the uplink transceiver "U" of node 813.

Figure 10B:
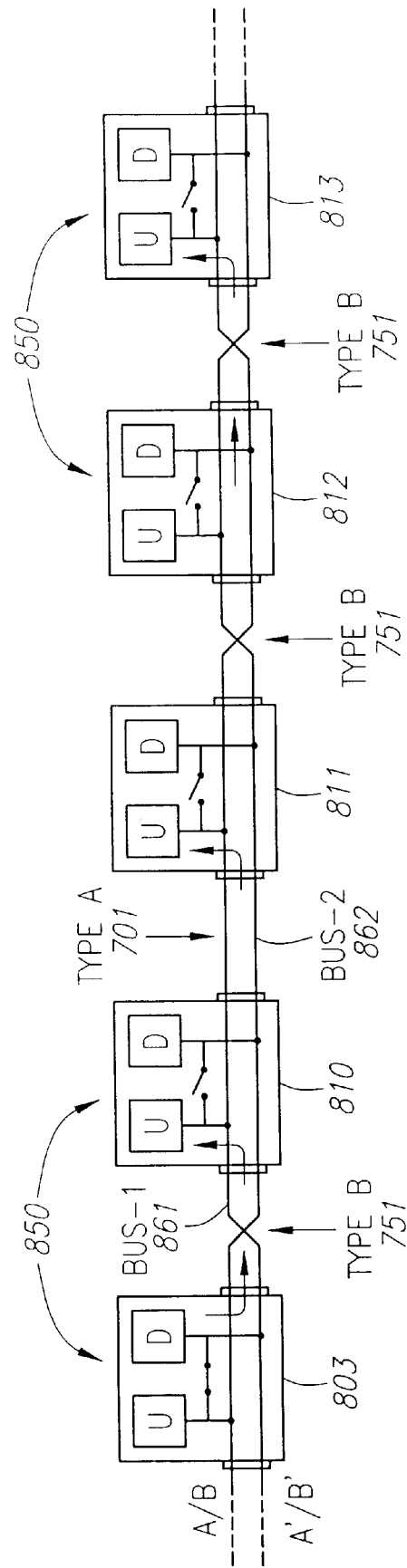
Figure 10C:
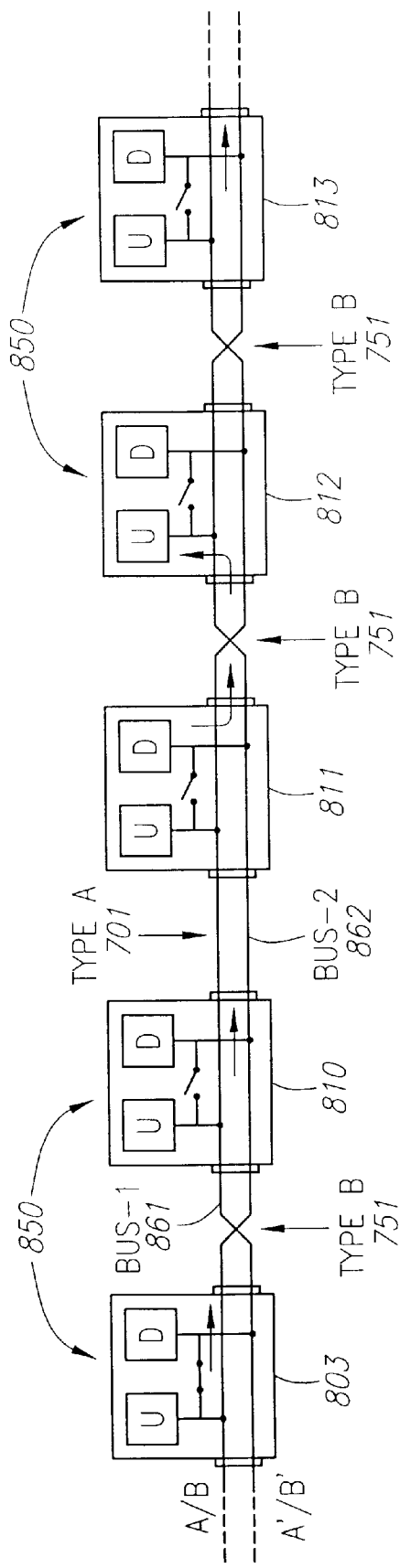

FIGS. 10B and 10C show exemplary signal paths for each of the two data buses 861, 862. FIG. 10B shows an exemplary signal path for the first data bus 861. The heavy arrows show a signal originating from the downlink transceiver "D" of the master node 803 and being propagated to the uplink transceiver "U" of nodes 810, 811 and 813, each of which receives information over the first data bus 861. Nodes 810, 811 and 813 may also transmit responsive messages over the first data bus 861 using the uplink transceiver "U". The heavy arrows also show the signal from the master node 803 bypassing node 812, which is a second-tier slave node.

FIG. 10C shows an exemplary signal path for the second data bus 861. The heavy arrows in FIG. 10C show a signal originating from second-tier master node 811 and being propagated to the uplink transceiver "U" of second-tier slave node 812, and then bypassing first-tier slave node 813. The signal continues to propagate in the loop and also bypasses first-tier slave node 810. (The first-tier master node 803 may simply have its uplink transceiver "U" disconnected if desired, or may otherwise be programmed to ignore signals from a second-tier master node source).

In one aspect of the invention, the use of Type A and Type B cable connectors 701 and 751 to connect nodes 850 in a loop pattern serve to establish multiple separate data buses in a hierarchical control network. Using a Type A cable connector 701 between two nodes 850 results in the two data buses 861, 862 remaining in the same relative paths. Using a Type B cable connector 751 between two nodes 850 causes the two data buses 861, 862 to cross over, such that the data bus connected to the downlink transceiver "D" of the previous node will be connected to the uplink transceiver "U" of the next node, and vice versa. A pattern of Type A and Type B cable connectors 701, 751 may be selected for a given loop so as to effectuate virtually any two-tier control network hierarchy having two data buses.

If more than two data buses are required, as for example where two or more first-tier slave nodes are to be used as second-tier master nodes for controlling separate data buses, then an additional pair or pairs of wires could be provided for each cable connector, and more types of cable connectors would typically be needed.

Figure 9:
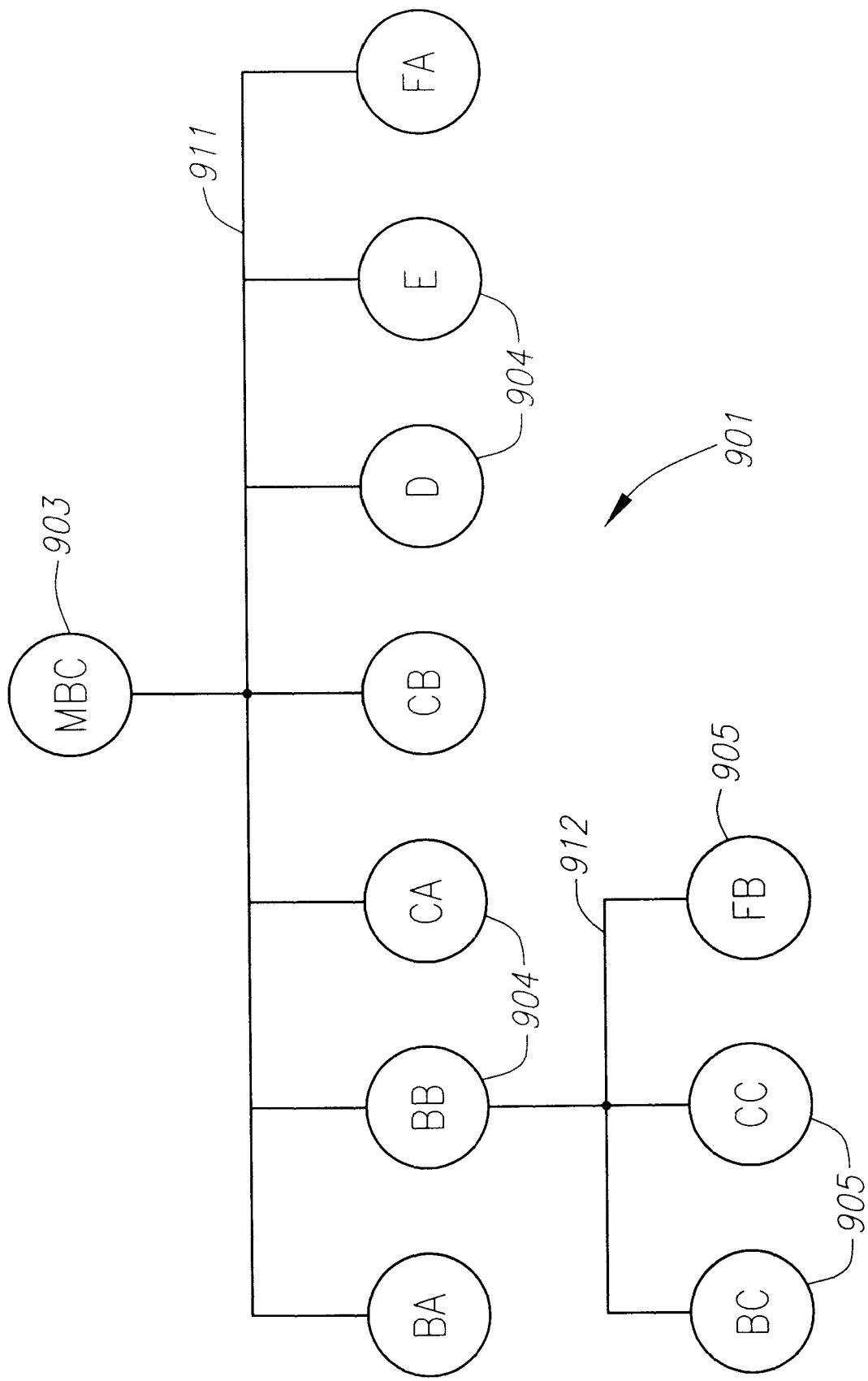
FIG. 9 is a conceptual hierarchical diagram of the control network of FIG. 8.

FIG. 9 is a conceptual diagram showing the resulting control hierarchy established by the choice of cable connectors 701 and 751 shown in FIG. 8. Two data buses 911 and 912, each defining a communication path for one tier of the control network, are shown in FIG. 9. The first-tier master node 903 (designated by the identifier "MBC" in FIGS. 8 and 9) is shown at the top of the hierarchy, with first-tier slave nodes 904 (designated by identifiers "BA", "BB", "CA", "CB", "D", "E" and "FA") shown connected to the first data bus 911. Any of the first-tier slave nodes 904 can be designated as the second-tier master node for controlling the second data bus 912. For example, assuming that node 811 of FIG. 8 (designated by the identifier "BB" in both FIGS. 8 and 9) is designated as the node controlling the second data bus 912, the second data bus 912 would be shown as in FIG. 9 as under the control of node BB. The second-tier slave nodes 905 are shown also connected to the second data bus 912. Whether a node 850 in FIG. 8 or 10A is linked with the first data bus 911 or second data bus 912 (shown in the conceptual diagram of FIG. 9) depends, as described previously, on which of the first data bus 861 and the second data bus 862 (shown in FIG. 10A) is connected to the uplink transceiver "U" and which to the downlink transceiver "D" of the node 850.

The nodes 850 may be physically dispersed within a vehicle or automated control system so as to carry out input/output or other control functions in an appropriate proximity. The nodes 850, as noted, are preferably connected in a loop pattern using a single continuous cable connecting all the nodes 850, with the cable only interrupted by the entry and exit connections at the nodes 850. Use of a single cable minimizes or dispenses with the need for is cumbersome junction boxes and or complicated wring between the nodes. Use of a single cable also simplifies assembly and maintenance, and allows rapid isolation of faults, short circuits, and the like.

Cable connectors 701 and 751 may have distinguishing features to enable engineers or maintenance personnel to readily distinguish them. For example, they may be outwardly labelled as "Type A" and "Type B," or they may be of different colors, or else may be distinguished by any other suitable means.

Connecting the nodes of the control network in a loop pattern using the Type A and Type B cable connectors also provides an expedient means for redundant backup control and, more specifically, for slave nodes to take over for the master node should a failure of the master node occur. Further details of redundant backup control appear in copending U.S. application Ser. No. 08/854,160, now U.S. Pat. No. 6,061,600, entitled "Backup Control Mechanism in a Distributed Control Network," previously incorporated herein by reference.

In a preferred embodiment, the nodes 530 of FIG. 5 are configured with fault isolation and recovery circuitry in the case of a short circuit or similar event. Details of such fault isolation and recovery circuitry are described in copending U.S. application Ser. No. 08/853,893, entitled "Fault Isolation and Recovery In A Distributed Control Network," previously incorporated herein by reference.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A multi-tier control network, comprising:
   a first common bus;
   a first-tier master node having a first-tier master node uplink transceiver and a first-tier master node downlink transceiver, said first tier master node downlink transceiver connected to said first common bus;
   a plurality of first-tier slave nodes electrically connected to said first common bus in a loop configuration;
   a second common bus, said second common bus connected to at least one of said first-tier slave nodes which functions as the second-tier master node with respect to the second common bus; and
   a plurality of second-tier slave nodes electrically connected to said second common bus in a loop configuration;
   wherein the first-tier master node uplink transceiver is connected to said second common bus.

2. The multi-tier control network of claim 1, wherein at least one of said first-tier slave nodes is capable of substituting itself for the first-tier master node upon failure of the first-tier master node.

3. The multi-tier control network of claim 2, wherein at least one of said second-tier slave nodes is capable of substituting itself for the second-tier master node upon failure of the second-tier master node.

4. The multi-tier network of claim 2, wherein said at least one first-tier slave node capable of substituting itself for the first-tier master node is the second-tier master node, and wherein said second-tier master node combines the first common bus and the second common bus into a single common bus when said second-tier master node substitutes itself as first-tier master node.

5. The multi-tier network of claim 1, wherein said first-tier master node, said first-tier slave nodes and said second-tier slave nodes are physically connected in a single loop.

6. The multi-tier network of claim 5, wherein said single loop comprises physical signal lines for both said first common bus and said second common bus.

7. The multi-tier network of claim 6, wherein each of said first-tier master node, said first-tier slave nodes and said second-tier slave nodes each comprise an uplink transceiver and a downlink transceiver, wherein the physical signal lines for the first common bus and the second common bus are connected in a feed-through path for nodes of the same tier and are connected in a cross-over path for nodes of different tiers.

8. A method of connecting nodes in a control network, comprising the steps of:
   electrically connecting a plurality of first-tier slave nodes to a first common bus in a loop configuration;
   connecting at least one of said first-tier slave nodes to a second common bus, said one first-tier slave node functioning as the second-tier master node with respect to the second common bus;
   electrically connecting a plurality of second-tier slave nodes to said second common bus in a loop configuration; and
   connecting a first-tier master node to said first common bus, a first-tier master node uplink transceiver being connected to said second common bus and a first-tier master node downlink transceiver being connected to said first common bus.

9. The method of claim 8, further comprising the step of substituting at least one of said first-tier slave nodes for the first-tier master node upon failure of the first-tier master node.

10. The method of claim 9, further comprising the step of substituting at least one of said second-tier slave nodes for the second-tier master node upon failure of the second-tier master node.

11. The method of claim 9, wherein said step of substituting at least one of said first-tier slave nodes for the first-tier master node comprises the steps of substituting the second-tier master node for the first-tier master node, and combining the first common bus and the second common bus into a single common bus when said second-tier master node substitutes itself as first-tier master node.

12. The method of claim 8, wherein said steps of electrically connecting a plurality of first-tier slave nodes to a first common bus in a loop configuration, connecting at least one of said first-tier slave nodes to a second common bus, said one first-tier slave node functioning as the second-tier master node with respect to the second common bus, electrically connecting a plurality of second-tier slave nodes to said second common bus in a loop configuration; and connecting a first-tier master node to said first common bus further comprises the step of physically connecting each of said nodes in a single loop.

13. The method of claim 12, wherein said step of physically connecting each of said nodes in a single loop comprises the step of connecting physical signal lines for both said first common bus and said second common bus to each of said nodes in the single loop.

14. The method of claim 13, wherein each of said first-tier master node, said first-tier slave nodes and said second-tier slave nodes each comprise an uplink transceiver and a downlink transceiver, the method further comprising the steps of connecting physical signal lines for the first common bus and the second common bus in a feed-through path for nodes of the same tier and in a cross-over path for nodes of different tiers.

15. A multi-tier control network, comprising:

a plurality of nodes connected in a loop configuration using a continuous cable; and a first bus and a second bus carried over said continuous cable;

wherein said plurality of nodes comprises a first-tier master node, a plurality of first-tier slave nodes, one of which functions as a second-tier master node, and a plurality of second-tier slave nodes;

wherein said first-tier slave nodes are electrically connected to said first bus and said second-tier slave nodes are electrically connected to said second bus; and wherein said first-tier master node comprises a downlink transceiver connected to said first bus, and an uplink transceiver connected to said second bus.

* * * * *

UNITED STATES PATENT AND TRADEMARK OFFICE
CERTIFICATE OF CORRECTION

PATENT NO. : 6,201,995 B1
DATED : March 13, 2001
INVENTOR(S) : Jeffrey Ying

It is certified that error appears in the above-identified patent and that said Letters Patent is hereby corrected as shown below:

Column 2,
Line 21, after "circuit" insert -- . --.
Line 29, after "effects", insert -- of --.

Column 3,
Line 43, after "having" delete "a".

Column 4,
Line 46, "256$k$" should be -- 256k --.
Line 53, delete "." after "commands".

Column 5,
Line 1, before "FIG. 1" delete "the".
Line 5, "230" should be -- 223 --.
Line 55, after "301", delete "is".

Column 6,
Line 12, "resect" should be -- respect --.
Line 43, after "203" insert -- and --.
Line 45, after "come to" insert -- a --.

Column 8,
Line 30, "limit" should be -- permit --.

Column 9,
Line 29, "are" should be -- is --.

Column 10,
Line 51, "611" should be -- 621 --.

Column 11,
Line 13, "died" should be -- directed --.

Column 13,
Line 25, before "operate" insert -- to --.

Column 14,
Line 1, "wines" should be -- wires --.
Line 28, "pair," should be -- pair; --.
Line 33, "761" should be -- 701 --.

UNITED STATES PATENT AND TRADEMARK OFFICE
CERTIFICATE OF CORRECTION

PATENT NO. : 6,201,995 B1
DATED : March 13, 2001
INVENTOR(S) : Jeffrey Ying

It is certified that error appears in the above-identified patent and that said Letters Patent is hereby corrected as shown below:

Column 15,
Line 49, "date" should be -- data --.

Column 16,
Line 26, after "disconnected" insert -- , --.
Line 29, "serve" should be -- serves --.

Column 17,
Line 12, after "need for" delete "is".
Line 13, "wring" should be -- wiring --.

Column 18,
Line 66, "configuration;" should be -- configuration, --.

Signed and Sealed this

Twenty-sixth Day of February, 2002

*Attest:*

JAMES E. ROGAN
*Director of the United States Patent and Trademark Office*

*Attesting Officer*